(12) United States Patent
Shimizu

(10) Patent No.: US 8,355,716 B2
(45) Date of Patent: Jan. 15, 2013

(54) COMMUNICATION SYSTEM, COMMUNICATION APPARATUS, COMMUNICATION METHOD AND COMPUTER PROGRAM

(75) Inventor: Hiroyuki Shimizu, Saitama (JP)

(73) Assignee: Sony Corporation, Tokyo (JP)

( * ) Notice: Subject to any disclaimer, the term of this patent is extended or adjusted under 35 U.S.C. 154(b) by 1451 days.

(21) Appl. No.: 11/809,103

(22) Filed: May 31, 2007

(65) Prior Publication Data

US 2007/0287456 A1    Dec. 13, 2007

(30) Foreign Application Priority Data

Jun. 8, 2006  (JP) ................................ P2006-159278

(51) Int. Cl.
*H04B 7/00*    (2006.01)

(52) U.S. Cl. ............... 455/435.1; 455/343.1; 455/343.2; 455/343.3; 455/574; 455/522; 370/310; 370/311; 370/318; 370/321; 370/338

(58) Field of Classification Search ............... 370/435.1, 370/318, 328, 338, 432, 535, 53, 310, 311, 370/321; 455/35.1, 343–343.5, 311, 522, 455/574

See application file for complete search history.

(56) References Cited

U.S. PATENT DOCUMENTS

| | | | |
|---|---|---|---|
| 6,289,227 B1 | 9/2001 | Shi | |
| 7,224,970 B2 * | 5/2007 | Smith et al. | 455/434 |
| 7,295,827 B2 * | 11/2007 | Liu et al. | 455/343.2 |
| 7,433,329 B2 * | 10/2008 | Qian | 370/310 |
| 2003/0148800 A1 | 8/2003 | Lee | |
| 2005/0025081 A1 | 2/2005 | Wakamatsu | |
| 2005/0237984 A1 * | 10/2005 | Benveniste | 370/338 |
| 2006/0146769 A1 * | 7/2006 | Patel et al. | 370/338 |
| 2007/0211745 A1 * | 9/2007 | Deshpande et al. | 370/432 |
| 2007/0248034 A1 * | 10/2007 | Hsu et al. | 370/318 |

FOREIGN PATENT DOCUMENTS

| | | |
|---|---|---|
| CN | 1656736 | 8/2005 |
| JP | 2004-128949 | 4/2004 |
| JP | 2004-320153 | 11/2004 |
| JP | 2005-026862 | 1/2005 |
| JP | 2005-064857 | 3/2005 |
| JP | 2005-217548 | 8/2005 |
| WO | WO 2006/033433 | 3/2006 |

* cited by examiner

*Primary Examiner* — Kiet Doan
*Assistant Examiner* — Michael T Vu
(74) *Attorney, Agent, or Firm* — Robert J. Depke; Rockey, Depke & Lyons, LLC

(57) ABSTRACT

Disclosed herein is a communication system wherein, non-periodical communications of data are carried out between an information transmitting terminal and one or more information receiving terminals, the information transmitting terminal periodically broadcasts network control information to the information receiving terminals, each of the information receiving terminals receives the network control information from the information transmitting terminal at a rate determined in advance, each of the information receiving terminals receives the network control information from the information transmitting terminal in a fixed-length information acquisition period; and at least some specific ones of the information receiving terminals each arbitrarily shift the starting point of the information acquisition period of the specific information receiving terminal.

23 Claims, 5 Drawing Sheets

F I G . 5
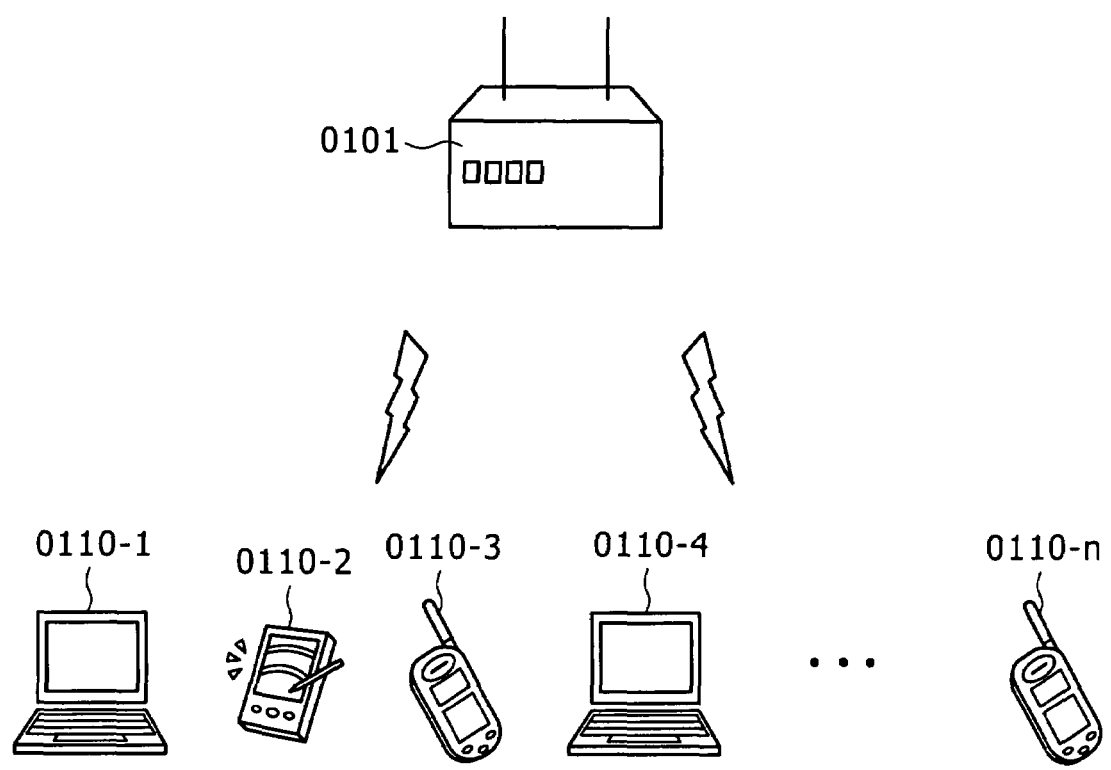

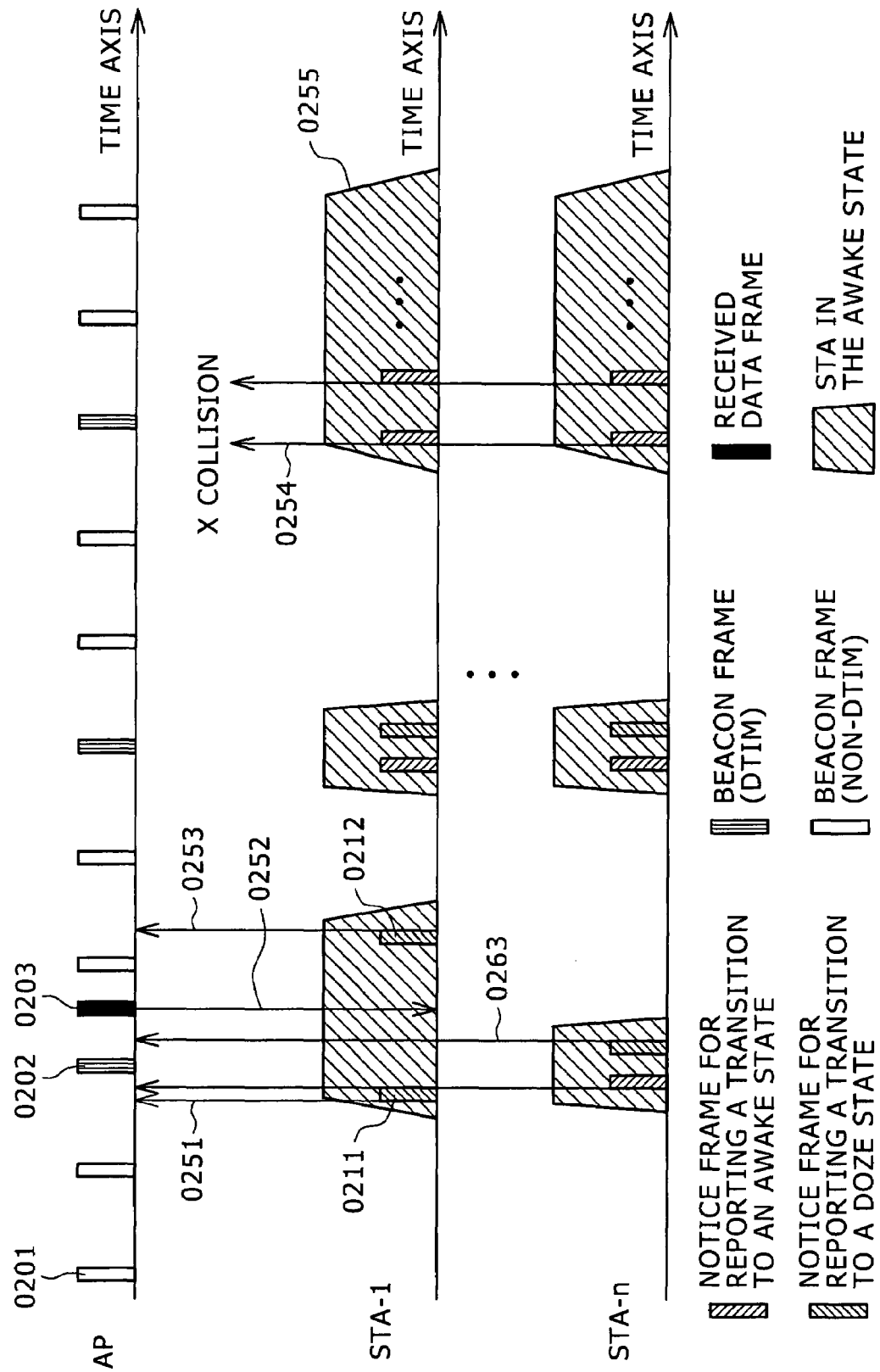

COMMUNICATION SYSTEM, COMMUNICATION APPARATUS, COMMUNICATION METHOD AND COMPUTER PROGRAM

CROSS REFERENCES TO RELATED APPLICATIONS

The present invention contains subject matter related to Japanese Patent Application JP 2006-159278 filed in the Japan Patent Office on Jun. 8, 2006, the entire contents of which being incorporated herein by reference.

BACKGROUND OF THE INVENTION

1. Field of the Invention

The present invention relates to a communication system connected to a base station and used for communicating data by adoption of a random back-off algorithm, relates to a communication apparatus employed in the communication system, relates to a communication method adopted by the communication apparatus as well as relates to a computer program for implementing the communication method. More particularly, the present invention relates to a communication system for carrying out intermittent operations in order to repeat a doze state and an awake state in a power save mode, relates to a communication apparatus employed in the communication system, relates to a communication method adopted by the communication apparatus as well as relates to a computer program for implementing the communication method. The doze state is a state in which the operations of at least some circuit modules employed in the communication apparatus are stopped. On the other hand, the awake state is a state in which all circuit modules employed in the communication apparatus operate fully.

To put it in more detail, the present invention relates to a communication system in which, in a power save mode, the communication apparatus functioning as a radio communication terminal makes a transition from the doze state to the awake state in order to receive beacon frames from the base station at beacon intervals determined in advance and at a rate also determined in advance and requests the base station to transmit data accumulated in the base station as data destined for the radio communication terminal to the radio communication terminal, relates to the communication apparatus employed in the communication system to serve as the radio communication terminal, relates to a communication method adopted by the communication apparatus as well as relates to a computer program for implementing the communication method. More particularly, the present invention relates to a communication system for avoiding collisions of notice frames transmitted by radio communication terminals to the base station with the notice frames contending with each other for the radio communication medium as notice frames each used for showing a transition from the doze state to the awake state or a demand for a transmission of data destined for the radio communication terminal from the base station to the radio communication terminal, relates to a communication apparatus employed in the communication system as the radio communication terminal, relates to a communication method adopted by the communication apparatus as well as relates to a computer program for implementing the communication method.

2. Description of the Related Art

As a system freed from wiring used in the wire communication method in the past, a radio communication network draws attention. As standard specifications for the radio communication network, the IEEE (The Institute of Electrical and Electronics Engineers) 802.11 standards (ANSI/IEEE std 802.11. 1999 Edition (R2003) Part 11: Wireless LAN Medium Access Control (MAC) and Physical Layer (PHY) Specifications, hereinafter referred to as Non-Patent Document 1) and the IEEE 802.15 standards are available.

Most radio communication LAN modules are mobile apparatus each driven by a battery. Examples of the mobile apparatus are a notebook PC (Personal Computer), a PDA (Personal Digital Assistant) and a radio communication IP (Internet Protocol) telephone. Thus, for a radio communication system conforming to the IEEE802.11 standards, specifications of a power save mode are written for the purpose of implementing reduction of power in an idle state of a radio communication terminal.

Let us consider a radio communication system like one shown in FIG. 5. An apparatus denoted by reference numeral 0101 is a radio communication base station for exchanging data with a radio communication terminal 0110 and providing a radio communication terminal 0110 with information by transmission of a frame to the radio communication terminal 0110. Apparatus denoted by reference numerals 0110-1, 0110-2, 0110-3, 0110-4, . . . and 0110-n are each the aforementioned radio communication terminal 0110.

The radio communication terminal 0110 has two operating modes, i.e., an active mode and a power save mode. In the active mode, the radio communication terminal 0110 is put in a state of being capable of exchanging data with the radio communication base station 0101. In the active mode, however, the radio communication terminal 0110 is put in a state of continuously waiting for the arrival of data even if no data is exchanged with the radio communication base station 0101. Thus, the radio communication terminal 0110 consumes power even if no data is exchanged with the radio communication base station 0101. In the power save mode, on the other hand, the radio communication terminal 0110 makes a transition to an awake state in which the radio communication terminal 0110 is capable of exchanging data with the radio communication base station 0101 only when data destined for the radio communication terminal 0110 arrives at the radio communication base station 0101. When no data is exchanged with the radio communication base station 0101, the radio communication terminal 0110 makes a transition to a doze state in which supplying of power to a circuit employed in the radio communication terminal 0110 as a circuit relevant to operations to exchange data with the radio communication base station 0101 is stopped in order to prevent unnecessary power from being supplied to the circuit. Thus, in the power save mode, the efficiency of power consumption is better than the active mode even though data cannot be exchanged with the radio communication base station 0101 immediately if the radio communication terminal 0110 happens to be in the doze state.

With the power save mode set as the operating mode, the radio communication terminal 0110 can be put in the aforementioned awake state or the doze state cited above. In the awake state, the radio communication terminal 0110 is capable of operating fully. In the doze state, on the other hand, the radio communication terminal 0110 operates at low power consumption but is not capable of exchanging data with the radio communication base station 0101.

When the radio communication terminal 0110 makes a transition from the active mode to the power save mode, the radio communication terminal 0110 makes use of a power management bit included in a frame control field of a transmitted frame to notify the radio communication base station 0101 that a transition from the active mode to the power save mode has been made.

When the radio communication base station 0101 receives a data frame destined for a specific radio communication terminal 0110 indicated by a destination address included in the data frame from another radio communication terminal 0110, the radio communication base station 0101 makes an attempt to deliver the data frame to the specific radio communication terminal 0110. If the specific radio communication terminal 0110 is operating in the doze state of the power save mode, however, the radio communication base station 0101 temporarily holds the data frame instead of transmitting the data frame to the specific radio communication terminal 0110 in accordance with a decision made by the radio communication base station 0101.

In addition, the radio communication base station 0101 transmits a beacon frame to every radio communication terminal 0110 periodically. The beacon frame is a frame describing control information necessary for operating the network. To be more specific, the beacon frame may include a TIM (Traffic Indication Map), which is information notifying the radio communication terminal 0110 operating in the power save mode that data destined for the radio communication terminal 0110 has arrived at the radio communication base station 0101 from another radio communication terminal 0110. In addition, the TIM also includes time information. A TIM with time information indicating timer contents of 0 is in particular referred to as a DTIM (Delivery TIM).

A radio communication terminal 0110 operating in the power save mode periodically makes a transition from the doze state to the awake state at beacon-frame receiving intervals set for the radio communication terminal 0110 and receives a data frame destined for the radio communication terminal 0110 from the radio communication base station 0101 at a typical rate of once every several transitions. To put it concretely, the radio communication terminal 0110 makes a transition from the doze state to the awake state with a timing adjusted to a transmission of a beacon frame including the DTIM described above from the radio communication base station 0101, receiving subsequent beacon frames from the radio communication base station 0101 in the awake state. In the awake state, the radio communication terminal 0110 interprets the TIM of every beacon frame received from the radio communication base station 0101 in order to produce a result of determination as to whether or not a data frame destined for the radio communication terminal 0110 is held by the radio communication base station 0101.

FIG. 6 is a diagram showing a typical procedure in accordance with which a radio communication terminal 0110 carries out an operation to receive data from the radio communication base station 0101 in the power save mode. In the typical case shown in the figure, it is assumed that a radio communication base station AP communicates with n radio communication terminals STA-1 to STA-n, which are connected to the radio communication base station AP. The radio communication base station AP and the radio communication terminals STA-1 to STA-n enter a stage at which a specific one of the radio communication terminals STA-1 to STA-n receives a data frame from another one of the radio communication terminals STA-1 to STA-n through the radio communication base station AP. In the following description, the radio communication terminals STA-1 to STA-n are each referred to simply as a radio communication terminal STA in case it is not necessary to distinguish the radio communication terminals STA-1 to STA-n from each other.

The radio communication base station AP transmits a beacon frame 0201 to every radio communication terminal STA periodically. When the contents of the timer become 0, the radio communication base station AP transmits a beacon frame 0202 including the DTIM to every radio communication terminal STA.

On the other hand, in order to receive the beacon frame 0202 including the DTIM from the radio communication base station AP, the radio communication terminal STA-1 operating in the power save mode makes a transition from the doze state to the awake state with a timing adjusted to the timing of the transmission of the beacon frame 0202 from the radio communication base station AP to the radio communication terminal STA-1. In addition, the radio communication terminal STA-1 transmits a frame 0211 showing a transition from the doze state to the awake state or a PS-Poll frame serving as a request for data destined for the radio communication terminal STA-1 to the radio communication base station AP. The frame 0211 is typically a null frame including no payload. In the following description, the frame 0211 and the PS-Poll frame are each referred to simply as a notice frame.

The radio communication terminal STA-1 already making a transition from the doze state to the awake state interprets the TIM included in the beacon frame 0202 in order to produce a result of determination as to whether or not a data frame destined for the radio communication terminal STA-1 is held by the radio communication base station AP.

From a null frame 0211 received from the radio communication terminal STA-1, the radio communication base station AP recognizes the fact that the radio communication terminal STA-1 transmitting the null frame 0211 has entered a state of being capable of receiving a data frame destined for the radio communication terminal STA-1 from the radio communication base station AP. Then, the radio communication base station AP transmits a data frame 0203 containing data held by the radio communication base station AP for the radio communication terminal STA-1 to the radio communication terminal STA-1 if such data is held by the radio communication base station AP for the radio communication terminal STA-1.

When the radio communication terminal STA-1 already making a transition from the doze state to the awake state completes the operation to receive data destined for the radio communication terminal STA-1 from the radio communication base station AP, the radio communication terminal STA-1 passes on the data to a communication application at a higher level layer. Then, the radio communication terminal STA-1 makes a transition from the awake state back to the doze state when the reception of data destined for the radio communication terminal STA-1 completed. In addition, the radio communication terminal STA-1 may transmit a frame 0212 showing the transition from the awake state back to the doze state. The frame 0212 is typically a null frame including no payload.

In addition, in order to receive the beacon frame 0202 including the DTIM from the radio communication base station AP, the radio communication terminal STA-n operating in the power save mode also makes a transition from the doze state to the awake state. The radio communication terminal STA-n also interprets the TIM included in the beacon frame 0202 and any subsequent beacon frame in order to produce a result of determination as to whether or not a data frame destined for the radio communication terminal is held by the radio communication base station AP. In this case, however, the result of the determination indicates that no data frame destined for the radio communication terminal STA-n is held by the radio communication base station AP. Thus, the radio communication terminal STA-n makes a transition from the awake state back to the doze state immediately. In addition, the radio communication terminal STA-n may transmit a frame 0212 showing the transition from the awake state back to the doze state. The frame 0212 is typically a null frame including no payload.

Power-saving operations in an infrastructure BSS (Base Service Set) mode conforming to the IEEE802.11 standards are summarized as follows.

(1): The radio communication terminal informs the radio communication base station of the number of beacons included in the period of a power save mode at an association time.

(2): The radio communication base station broadcasts beacons at beacon intervals determined in advance to the radio communication terminal and makes use of the TIM portion of the beacon to reveal the fact that data destined for the radio communication terminal operating in the power save mode is held in a buffer employed in the station.

(3): In order for a radio communication terminal to receive a scheduled beacon referred to as a DTIM beacon from the radio communication base station, the radio communication terminal makes a transition from the doze state to the awake state with a timing adjusted to the timing of the transmission of the DTIM beacon from the radio communication base station to the radio communication terminal.

(4): When the radio communication terminal already making a transition from the doze state to the awake state receives a beacon frame from the radio communication base station, the terminal interprets the TIM included in the beacon frame in order to produce a result of determination as to whether or not a data frame destined for the terminal is held in a buffer employed in the station. If the result of the determination indicates that a data frame destined for the radio communication terminal is held in a buffer employed in the radio communication base station, the terminal transmits a PS-Poll frame indicating a request for the data to the station.

(5): The radio communication terminal transmits a frame indicating the start of a power-saving operation to the radio communication base station and, at a point of time an Ack (acknowledgement) confirmation message is received from the station, the terminal initially sets the doze state.

The timing with which the radio communication terminal operating in the power save mode makes a transition from the doze state to the awake state or vice versa is determined by the beacon interval at which the radio communication base station broadcasts beacon frames to radio communication terminals and a rate representing a ratio of the number of beacons each including a DTIM to the number of all beacons during a period of time. Thus, by lengthening the beacon interval or decreasing the DTIM-beacon rate, the period in which the radio communication terminal is put in the doze state can be prolonged and, hence, the power saving effect can be improved.

In addition, in order to avoid wasteful power consumption by fully operating the radio communication terminal already making a transition from the doze state to the awake state in order to receive a beacon frame from the radio communication base station, a lazy state consuming little power in comparison with the awake state is defined. The lazy state is an operating state in which a process of reception and a synchronization process are put in an on state but a transmission process and an authentication process are put in an off state. The lazy state has been proposed for a radio communication terminal for carrying out a process to receive a beacon frame from the radio communication base station in Japanese Patent Laid-open No. 2005-64857 (hereinafter referred to as Patent Document 1). The power consumption of this radio communication terminal can be made small in comparison with the radio communication terminal having only the doze and awake states as states existing in the power save mode without reducing the throughput of the data communication.

The radio communication terminals operating in the power save mode can thus be classified into a category adjusting the DTIM rate and a category adopting the lazy state. Nevertheless, the radio communication terminals pertaining to both the categories are identical to each other in that they make a transition from the doze state to the awake state in response to a beacon frame received from the radio communication base station. However, a detailed timing with which the radio communication terminal makes a transition from the doze state to the awake state is not fixed up in particular. Thus, if a plurality of radio communication terminals transmit notice frames such as null frames or PS-Poll frames to the radio communication base station at intervals synchronized to the DTIM intervals, it is quite within the bounds of possibility that there are generated collisions of the frames contending with each other for the radio communication medium. In addition, if timings taken by the radio communication terminals as timings to make a transition from the doze state to the awake state are concentrated on a specific beacon frame, there is raised a problem that a radio communication terminal is hardly capable of acquiring data held in the radio communication base station during the doze state as data destined for the radio communication terminal.

As a policy to avoid collisions of frames contending with each other for the radio communication medium, the IEEE802.11 prescribes a CSMA/CA (Carrier Sense Multiple Access/Collision Avoidance) procedure and a random back-off algorithm. The random back-off algorithm is an algorithm in accordance with which a wait time is determined at random for transmission opportunities of radio communication terminals and a transmission of data is started if a communication medium is determined to be usable after waiting for the transmission by the determined wait time prior to the transmission.

If the number of radio communication terminals each connected to the radio communication base station is small, there are only few cases in which the wait times determined at random for transmission opportunities of the radio communication terminals overlap each other. Thus, by adoption of the random back-off algorithm, it is possible to avoid collisions of notice frames contending with each other for the radio communication medium. As the number of radio communication terminals each connected to the radio communication base station increases, however, the number of radio communication terminals each making a transition from the doze state to the awake state in order to receive a beacon frame from the radio communication base station also increases as well. Thus, for a beacon frame, the number of radio communication terminals each transmitting a notice frame indicating the transition from the doze state to the awake state to the radio communication base station also increases. The increased number of radio communication terminals each transmitting such a notice frame to the radio communication base station means that there is a greater risk of collisions of notice frames contending with each other for the radio communication medium.

When a notice frame collides with another notice frame, the adoption of the random back-off algorithm can be repeated but the repeated adoption of the random back-off algorithm causes the transmission of the notice frame from one of the colliding radio communication terminals to be put in a wait state for long time. In this case, since the radio communication terminal with the notice-frame transmission put in the wait state is also put in a wait state in the awake mode, the radio communication terminal undesirably consumes power in a wasteful manner. In addition, even if the radio communication terminal interprets the TIM included in the beacon frame, producing a determination result indicating that no data frame destined for the terminal is held in the station, the wait state of the transmission of a notice frame indicating an impending transition from the awake state back to the doze state is repeated in an attempt to retransmit the notice frame unless the an acknowledgement is received from the radio communication base station in response to such a notice frame. Thus, the radio communication terminal hardly returns to the doze state from the awake state. As a result, the power saving effect deteriorates.

In addition, if the number of notice frames each put in a wait state increase to a very large value, it is quite within the bounds of possibility that more wait times set by adoption of the random back-off algorithm overlap with each other. Thus, it is also quite within the bounds of possibility that more collisions of notice frames contending with each other for the radio communication medium take place as indicated by reference numeral 0254 shown in FIG. 6.

On top of that, if a plurality of radio communication terminals are each put in a state of being incapable of transmitting a notice frame to the radio communication base station no matter how long the waiting time of each of the radio communication terminals may be due to the phenomenon described above, the communication medium is occupied by retransmitted notice frames. It is thus feared that such a state causes the performance of the whole system to deteriorate.

In addition, in the case of a system in which a notice frame is also transmitted from a radio communication terminal to the radio communication base station in order to indicate that the radio communication terminal is going to make a transition from the awake state back to the doze state, the waiting period of the notice frame makes the radio communication terminal incapable of making a transition from the awake state back to the doze state. Thus, the radio communication terminal undesirably consumes power in a wasteful manner as is the case with the repeated random back-off algorithm described above.

For example, in the case of a system in which a radio communication terminal transmitting data at a data-transmitting time to the radio communication base station adds information on a time of a planned transmission of next data to the data being transmitted this time whereas the radio communication terminal receiving the data at a data-receiving time from the radio communication base station stays in a sleep state till the time of the planned transmission of the next data, makes a transition to an activation state at the time of the planned transmission of the next data and receives the next data from the radio communication base station, an operation to save power can be carried out efficiently if the radio communication base station functioning as a terminal for delivering data transmitted by a data transmitting radio communication terminal to a data receiving radio communication terminal adjusts a time added by the data transmitting radio communication terminal to the transmitted data as the time of a planned transmission of next data in such a way that the time does not coincide with a time added by another data transmitting radio communication terminal. Such a system is described in Japanese Patent Laid-open No. 2004-320153 (Hereinafter referred to as Patent Document 2). However, the system is a system designed without effectively considering a case in which a large number of radio communication terminals each put in a power save mode are connected to the radio communication base station and operate at the same time. In addition, while a transmitted frame is required to have a frame configuration allowing a time of a planned transmission of next data to be included in the transmitted frame, such a frame configuration is difficult to implement by making use of the radio communication base station conforming to standard specifications established so far.

In addition, there has been proposed a radio communication terminal management method adopted by the radio communication base station as an adjustment method for preventing timings each taken by a radio communication terminal as a timing to make a transition from a power save mode to an active mode from overlapping with each other. The radio communication terminal management method is disclosed in Japanese Patent Laid-open No. 2005-26862 (hereinafter referred to as Patent Document 3). In this case, on the basis of power save periods collected from radio communication terminals, the radio communication base station prevents timings each taken by a radio communication terminal as a timing to make a transition from a power save mode to an active mode from overlapping with each other along the time axis by, for example, changing the power save periods to variable periods and shifting the timings to make a transition from a power save mode to an active mode.

SUMMARY OF THE INVENTION

Addressing the problems described above, inventors of the present invention have innovated an excellent communication system connected to a radio communication base station as a system capable of carrying out stable data communications by adoption of a random back-off algorithm, innovated a communication apparatus employed in the communication system, innovated a communication method adopted by the communication apparatus as well as innovated a computer program for implementing the communication method.

The inventors of the present invention have also innovated an excellent communication system connected to a radio communication base station as a system capable of carrying out stable data communications by performing intermittent operations in order to repeat a doze state and an awake state in a power save mode, innovated a communication apparatus employed in the communication system, innovated a communication method adopted by the communication apparatus and the communication system as well as innovated a computer program for implementing the communication method.

The inventors of the present invention have also innovated an excellent communication system capable of carrying out stable data communications by allowing a radio communication terminal to make a transition from the doze state to the awake state in order to receive beacon frames transmitted by the base station at beacon intervals determined in advance and at a rate determined in advance and request data accumulated in the base station as data destined for the radio communication terminal in a power save mode, innovated a communication apparatus employed in the communication system, innovated a communication method adopted by the communication apparatus and the communication system as well as innovated a computer program for implementing the communication method.

The inventors of the present invention have also innovated an excellent communication system capable of carrying out stable communications of data and well preventing a power saving function from deteriorating by avoiding collisions of notice frames transmitted by radio communication terminals in a state of contending with each other for the radio communication medium as notice frames each used for showing a transition from the doze state to the awake state and a demand for a transmission of data from the base station without requiring the radio communication base station to carry out special operations even if the number of radio communication terminals connected to the radio communication base station increases, innovated a communication apparatus employed in the communication system, innovated a communication method adopted by the communication apparatus and the communication system as well as innovated a computer program for implementing the communication method.

In order to solve the problems described above, in accordance with an embodiment of the present invention, there is provided a communication system wherein, non-periodical communications of data are carried out between an information transmitting terminal and one or more information receiving terminals, the information transmitting terminal periodically broadcasts network control information to the information receiving terminals, each of the information receiving terminals receives the network control information from the information transmitting terminal at a rate determined in advance, each of the information receiving terminals receives the network control information from the information transmitting terminal in a fixed-length information acquisition period; and at least some specific ones of the information receiving terminals each arbitrarily shift the starting point of the information acquisition period of the specific information receiving terminal.

In accordance with another embodiment of the present invention, there is provided a communication method adopted by a communication apparatus to carry out non-periodical communications of data with another terminal periodically broadcasting network control information to the communication apparatus, the communication method comprising, a starting-point determination step of arbitrarily determining the start point of an information acquisition period of the communication apparatus to receive network control information from the other terminal; and a network control information acquisition step of acquiring the network control information from the other terminal at the start point of each information acquisition period of the communication apparatus.

In accordance with yet another embodiment of the present invention, there is provided a communication method adopted by a communication apparatus to carry out non-periodical communications of data with another terminal periodically broadcasting network control information to the communication apparatus, the communication method including, a starting-point determination step of arbitrarily determining the start point of an information acquisition period of the communication apparatus to receive network control information from the other terminal; and a network control information acquisition step of acquiring the network control information from the other terminal at the start point of each information acquisition period of the communication apparatus.

In accordance with the present invention, there is provided an excellent communication system in which, in a power save mode, a radio communication terminal makes a transition from a doze mode to an awake mode for receiving beacon frames, which are broadcasted by a radio communication base station at predetermined beacon intervals determined in advance, at a rate also determined in advance and requests the radio communication base station to transmit data received from another radio communication terminal for the radio communication terminal and held in the radio communication base station as data destined for the radio communication terminal to the radio communication terminal in order to carry out a stable communication of the data with the other radio communication terminal, and provided radio communication apparatus to serve as the radio communication terminals and the radio communication base station, a radio communication method to be adopted by the radio communication apparatus as well as a computer program implementing the radio communication method.

In addition, also in accordance with the present invention, there is provided an excellent communication system capable of carrying out stable communications of data and well preventing a power saving function from deteriorating by avoiding collisions of notice frames transmitted by radio communication terminals in a state of contending with each other for the radio communication medium as notice frames each used for showing a transition from the doze state to the awake state and a demand for a transmission of data from the base station without requiring the radio communication base station to carry out special operations even if the number of radio communication terminals connected to the radio communication base station increases, and provided a radio communication apparatus to serve as the radio communication terminals and the radio communication base station, a radio communication method to be adopted by the radio communication apparatus as well as a computer program implementing the radio communication method.

Thus, the radio communication base station provided by the present invention as a radio communication base station for accommodating radio communication terminals in a cell is no longer required to process a number of notice frames received from radio communication terminals at the same time. That is to say, the load borne by the radio communication base station is distributed. Thus, the degree of tolerance in regard to the number of radio communication terminals connected to the same radio communication base station at the same time can be raised.

The present invention can be applied to a radio communication terminal participating in a radio communication system in which beacon frames are broadcasted by a radio communication base station periodically. In this case, the radio communication base station can be an apparatus designed and manufactured in accordance with standard specifications established so far. In addition, any other radio communication terminal connected to the same radio communication base station does not have to be a radio communication terminal according to the present invention. Since the radio communication terminal provided by the present invention as a concrete apparatus makes a transition from the doze state to the awake state with a timing different from the other radio communication terminal, collisions of notice frames contending with each other for the radio communication medium can be avoided. Thus, a request for a transmission of data from the radio communication base station to the radio communication terminal can be transmitted from the radio communication terminal to the radio communication base station smoothly and a transition from the awake state back to the doze state can be made also smoothly as well. As a result, the power saving effect can be improved.

Of course, even if the number of radio communication terminals each provided by the present invention as a radio communication terminal existing in the cell becomes a large fraction of the number of all radio communication terminals in the cell, timings with which the radio communication terminals each make a transition from the doze state to the awake state are not concentrated on the timing to receive a beacon frame including the DTIM from the radio communication base station. Thus, it is possible to distribute timings with which the radio communication terminals each make a transition from the doze state to the awake state throughout a predetermined period of time, in which beacon frames are broadcasted by the radio communication base station at beacon intervals. As a result, the performance of the radio communication system as a whole can be improved and the number of radio communication terminals that can be connected to the same radio communication base station can be increased.

These and other objects and features of the present invention will become clear from the following description of the preferred embodiments given with reference to the accompanying diagrams.

BRIEF DESCRIPTION OF THE DRAWINGS

FIG. 5 is a diagram showing a typical configuration of a radio communication system employing a radio communication base station and a plurality of radio communication terminals connected to the radio communication base station; and FIG. 6 is a diagram showing a typical procedure in the past in accordance with which a radio communication terminal carries out an operation to receive data from a radio communication base station in a power save mode.

DETAILED DESCRIPTION OF THE PREFERRED EMBODIMENTS

Figure 1:
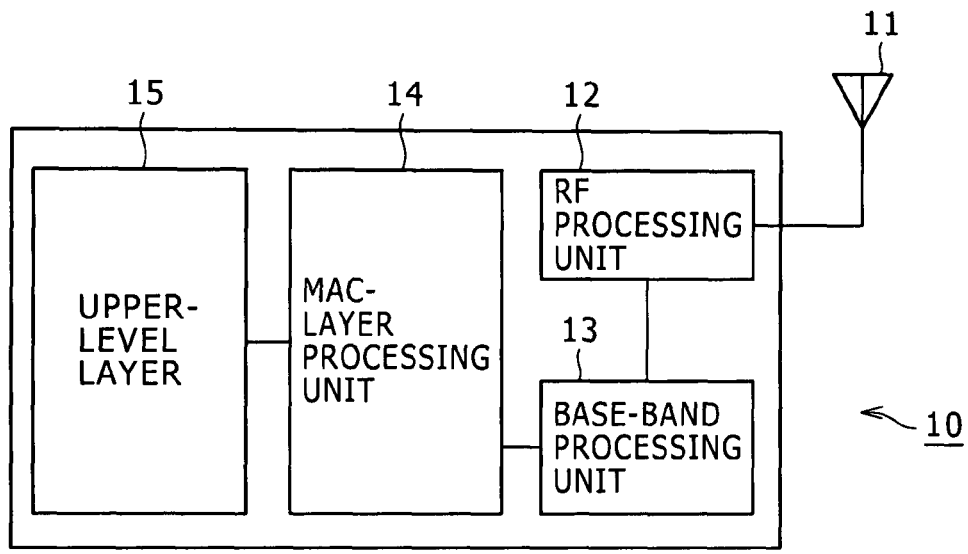
FIG. 1 is a diagram showing a typical configuration of a radio communication terminal processing a beacon frame received from a radio communication base station.

A preferred embodiment of the invention is explained by referring to diagrams as follows.

An embodiment of the present invention assumes a radio communication system, which typically operates in an infrastructure BSS (Base Service Set) mode conforming to the IEEE802.11 standards. In a system of this type, a radio communication base station broadcasts beacon frames at beacon intervals determined in advance in order to control radio communication terminals existing in a cell of the system. Connected to the radio communication base station, the radio communication terminals communicate data to each other by adoption of a so-called random back-off algorithm.

The IEEE802.11 standards prescribe an active mode and a power save mode. A radio communication terminal put in the power save mode carries out intermittent operations in order to repeatedly make transitions from a doze state to an awake state and vice versa. The doze state is a state in which the operations of at least some circuit modules employed in the radio communication terminal are stopped. On the other hand, the awake state is a state in which all circuit modules of the radio communication terminal operate fully. In addition, in the power save mode, a radio communication terminal makes a transition from the doze state to the awake state in order to receive beacon frames broadcasted by the radio communication base station at beacon intervals determined in advance and at a rate also determined in advance, and requests a transmission of data accumulated in the base station as data destined for the radio communication terminal from base station to the radio communication terminal. Operations are carried out in the power save mode as follows.

(1): The radio communication terminal informs the radio communication base station of the number of beacons included in the period of a power save mode at an association time.

(2): The radio communication base station broadcasts beacon frames at beacon intervals determined in advance to the radio communication terminal and makes use of a TIM portion of the beacon frame to reveal the fact that data destined for the radio communication terminal operating in the power save mode is held in a buffer employed in the station.

(3): In order for a radio communication terminal to receive a scheduled beacon frame referred to as a DTIM beacon frame from the radio communication base station, the radio communication terminal makes a transition from the doze state to the awake state with a timing adjusted to the timing of the transmission of the DTIM beacon frame from the radio communication base station to the radio communication terminal.

(4): When the radio communication terminal already making a transition from the doze state to the awake state receives a beacon frame from the radio communication base station, the terminal interprets the TIM included in the beacon frame in order to produce a result of determination as to whether or not a data frame destined for the terminal is held in a buffer employed in the station. If the result of the determination indicates that a data frame destined for the radio communication terminal is held in the buffer employed in the radio communication base station, the terminal transmits a PS-Poll frame requesting the station to transmit the data to the terminal.

(5): The radio communication terminal transmits a frame indicating the start of a power-saving operation to the radio communication base station and, at a point of time an Ack (acknowledgement) confirmation message is received from the station, the terminal initially sets the doze state.

The following description assumes a communication environment in which, in an infrastructure BSS (Base Service Set) mode conforming to the IEEE802.11 standards, a plurality of radio communication terminals are connected to a radio communication base station as shown in FIG. 5 so that the radio communication terminals are capable of communicating data with each other through the radio communication base station. Most of the radio communication terminals are mobile apparatus each driven by a battery. Examples of the mobile apparatus are a notebook PC (Personal Computer), a PDA (Personal Digital Assistant) and a radio communication IP (Internet Protocol) telephone. Each of the radio communication terminals carries out intermittent operations, repeatedly making transitions from the doze state to the awake state in the power save mode and vice versa in order to receive beacon frames from the radio communication base station. In addition, each of the radio communication terminals transmits typically a null frame showing the transition from the doze state to the awake state or a PS-Poll frame indicating a request for a transmission of data to the radio communication base station. In the following description, the null frame showing a transition state and the PS-Poll frame are each referred to as a notice frame.

FIG. 1 is a diagram showing a typical configuration of a radio communication terminal 10 connected to the radio communication base station. As shown in the figure, the radio communication terminal 10 employs an antenna 11, an RF processing unit 12, a base-band processing unit 13, an MAC (Media Access Control) layer processing unit 14 and an upper-level layer 15. The following description explains a method for processing a beacon frame received by the radio communication terminal 10 from the radio communication base station.

The antenna 11 is an antenna used for both information/data receptions and transmissions. In an operation to transmit data from the radio communication terminal 10 to the radio communication base station, the upper-level layer 15 requests the MAC layer processing unit 14 to transmit the data. At the request made by the upper-level layer 15, the MAC layer processing unit 14 generates header information to be used for constructing a MAC frame. Then, the base-band processing unit 13 carries out a modulation process and a D/A conversion process on the MAC frame serving as a signal to be transmitted. Subsequently, the base-band processing unit 13 carries out a frequency conversion process on an analog base-band signal obtained as a result of the D/A conversion process in order to perform an up-conversion process to convert the analog base-band signal into an RF signal. The RF processing unit 12 then amplifies the power of the RF signal and outputs the amplified signal to a transmission line by way of the antenna 11.

In an operation to receive data from the radio communication base station, on the other hand, an RF signal received by the antenna 11 from the transmission line is subjected to a low-noise amplification process carried out by the RF processing unit 12, which also removes unnecessary frequency components from the RF signal. Then, the base-band processing unit 13 carries out a frequency conversion process on the RF signal output by the RF processing unit 12 in order to perform a down-conversion process to convert the RF signal into an analog base-band signal. Subsequently, the base-band processing unit 13 carries out an A/D conversion process on the analog base-band signal and a demodulation process on a digital signal obtained as a result of the A/D conversion process. Then, the MAC layer processing unit 14 interprets the header information of a signal output by the base-band processing unit 13 and assembles the original data stream from the payload of the signal. Finally, the MAC layer processing unit 14 supplies the data stream to the upper-level layer 15.

As described above, the MAC layer processing unit 14 generates header information for a frame to be transmitted and interprets the header information included in a beacon frame received from the radio communication base station in order to decode the beacon frame. The MAC layer processing unit 14 also executes various kinds of control. For example, the MAC layer processing unit 14 controls a communication procedure based on a communication protocol such an RTS (Request To Send) protocol and a CTS (Cleared To Send) protocol. The MAC layer processing unit 14 also executes control of a timing to transmit a frame by adoption of a random back-off algorithm. In addition, the MAC layer processing unit 14 also controls a power-saving state as well.

On the basis of a DTIM timer value included in a TIM portion of a beacon frame received from the radio communication base station, in the power save mode, the MAC layer processing unit 14 executes control to make a transition from the doze state to the awake state with a timing adjusted to the timing to receive the beacon frame. In addition, if the TIM of the received beacon frame indicates that data destined for the radio communication terminal is held in a buffer employed in the radio communication base station, the radio communication terminal transmits a request for the data to the radio communication base station by adoption of a random back-off algorithm in order to acquire the data from the station.

Figure 2:
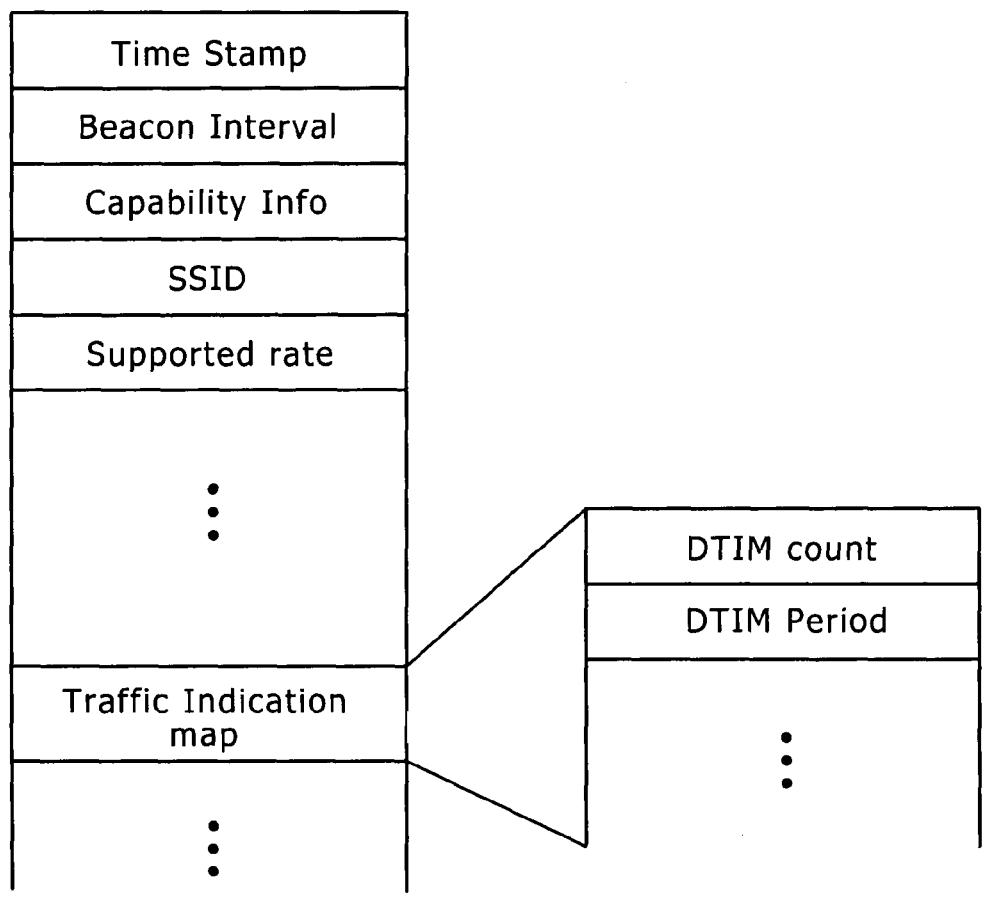
FIG. 2 is a diagram showing representatives of information included in a beacon frame conforming to IEEE802.11 standards.

FIG. 2 is a diagram showing information included in a beacon frame as information set in accordance with the IEEE802.11 standards.

A timestamp included in a beacon frame is time information generated by a timer employed in the radio communication base station broadcasting the beacon frame. A beacon interval is a period of time between 2 consecutive beacon frames, or a period in which the radio communication base station issues one beacon frame. Capability information is various kinds of information such as information on encryption and information indicating whether or not the radio communication terminal is allowed to make a CF polling request. An SSID (Service Set ID) includes the ID of a service set such as an ESS (Extended Service Set) or an IBSS (Independent Base Service Set). A supported parameter set is a channel number. A TIM includes information on the power save mode.

As described earlier, the TIM is information for notifying a radio communication terminal operating in the power save mode that data destined for the radio communication terminal has arrived at the radio communication base station from another radio communication terminal. The TIM of the beacon frame includes a DTIM count serving as a counter value and a DTIM period of the counter. The DTIM count serving as a counter value is information indicating whether or not the TIM is a DTIM, which is a TIM for a timer value of 0. In other words, the DTIM is a DTIM count equal to 0. On the other hand, the DTIM period is the period of the DTIM. The DTIM period is the number of beacon frames broadcasted by the radio communication base station between two consecutive DTIM beacon frames, which are each a beacon frame including a DTIM. The initial value of the DTIM count is the DTIM period.

The DTIM count included in the beacon frame to serve as a counter value is decremented by 1 every time a beacon frame is broadcasted by the radio communication base station. Initially, the DTIM count serving as a timer value is set at a maximum value equal to the DTIM period. In accordance with the IEEE802.11 standards, the DTIM is defined as a TIM included in a beacon frame as a TIM with the DTIM equal to 0. The beacon frame broadcasted right after a beacon frame including a DTIM has a TIM with the DTIM count set at the DTIM period. Thereafter, the DTIM count serving as a counter value is decremented again by 1 every time a beacon frame is broadcasted by the radio communication base station.

In the radio communication system conforming to the IEEE802.11 standards in the past, at the same time, each of radio communication terminals operating in the power save mode makes a transition from the doze state to the awake state with a timing adjusted to the arrival of a beacon frame including a DTIM having the counter DTIM count in its TIM decremented to 0. For this reason, as the number of radio communication terminals accommodated in a cell increases, transmissions of notice frames from the radio communication terminals to the radio communication base station are concentrated undesirably on a specific period. As described earlier, the notice frames transmitted by a radio communication terminal are a null frame indicating a transition made by the radio communication terminal from the doze state to the awake state and a PS-Poll frame requesting the radio communication base station to transmit data received by the radio communication base station from another radio communication terminal prior to the transition made by the radio communication terminal from the doze state to the awake state as data destined for the radio communication terminal transmitting the PS-Poll frame to the radio communication terminal. With the notice-frame transmission concentrated in this way, there is raised a problem that the radio communication terminal is hardly capable of receiving data held by the radio communication base station in the doze state as data destined for the radio communication terminal due to collisions of the notice frames with each other for the radio communication medium.

In accordance with the IEEE802.11 standards, the random back-off algorithm is adopted in order to avoid collisions of notice frames contending with each other for the radio communication medium. Thus, when the number of radio communication terminals connected to the radio communication base station increases, in anticipation of a beacon frame including a DTIM, the number of radio communication terminals each making a transition from the doze state to the awake state with a timing adjusted to the arrival of the beacon frame including a DTIM also increases as well. In consequence, it is no longer possible to avoid collisions of notice frames contending with each other for the radio communication medium. As a result, the number of radio communication terminals each existing in a wait state also increases as well. In the wait state, each of the radio communication terminals is waiting for an opportunity to transmit a notice frame to the radio communication base station and consuming power wastefully due to the fact that the radio communication terminal has been put in the awake state.

In order to solve the problem, in this embodiment, a radio communication terminal makes a transition from the doze state to the awake state with a timing adjusted to the arrival of a beacon frame having a counter DTIM count X unique to the radio communication terminal in place of the arrival of the beacon frame including a DTIM common to all radio communication terminals. That is to say, in the power save mode, the beacon frame including a DTIM having the counter DTIM count in its TIM decremented to 0 is not used as the starting point of a period for acquiring beacon frames distributed by the radio communication base station. Instead, for each radio communication terminal, a transition value X unique to the radio communication terminal can be set independently of the other radio communication terminals. When the decremented DTIM count serving as a timer value is expected to become equal to the transition value X set for a radio communication terminal, the radio communication terminal makes a transition from the doze state to the awake state. That is to say, the transition value X unique to a radio communication terminal serves as the starting point of a period used by the radio communication terminal as a period for acquiring beacon frames distributed by the radio communication base station.

Thus, the timings each used by a radio communication terminal to make a transition from the doze state to the awake state at a point of time in a period for acquiring beacon frames from the radio communication base station in the power save mode are no longer concentrated on the arrival of a beacon frame including a DTIM with the DTIM count of the timer becoming equal to 0. That is to say, the timings are distributed to points of time, which are adjusted to arrivals of beacon frames distributed at beacon intervals determined in advance. Thus, even if the number of radio communication terminals connected to the same radio communication base station increases, the number of radio communication terminals each making a transition from the doze state to the awake state to receive a distributed beacon frame can be suppressed. As a result, by adoption of the random back-off algorithm, it is possible to effectively avoid collisions of notice frames contending with each other for the radio communication medium by adoption of the random back-off algorithm in the same way as a case in which the number of radio communication terminals connected to the same radio communication base station is small.

As described above, by setting the starting point of the beacon acquisition period of a radio communication terminal at the DTIM counter value X unique to the radio communication terminal at the beginning of the power saving operation of the radio communication terminal, it is possible to easily avoid collisions of notice frames contending with each other for the radio communication medium. That is to say, the radio communication terminal is capable of avoiding collisions of notice frames contending with each other for the radio communication medium without requiring the radio communication base station to carry out a special operation. It is thus possible to easily apply the present invention also to a cell connected to a radio communication base station conforming to standard specifications established so far as a cell of radio communication terminals.

In addition, for each radio communication terminal, the value X of the DTIM timer can also be set independently to serve as the origin of the period to receive beacon frames from the radio communication base station so that the timings each used by a radio communication terminal to make a transition from the doze state to the awake state at a point of time in a period for acquiring beacon frames from the radio communication base station in the power save mode are distributed to points of time, which are adjusted to arrivals of beacon frames distributed at beacon intervals determined in advance. In this case, the radio communication base station is no longer required to carry out a large number of notice frames once. That is to say, since the load borne by the radio communication base station is distributed throughout a period of time in which beacon frames are broadcasted by the radio communication base station at beacon intervals, the degree of tolerance in regard to the number of radio communication terminals connected to the same radio communication base station at the same time can be raised.

Such a radio communication terminal may also set the value X of the DTIM timer arbitrarily to serve as the origin of the period to receive beacon frames from the radio communication base station typically by referring to the substance of information included in the beacon frame received from the radio communication base station. As an alternative, even in the case of a radio communication base station conforming to the standard specifications in the past, a radio communication terminal may set the value X of the DTIM timer arbitrarily to serve as the origin of the period to receive beacon frames from the radio communication base station on the basis of information held by the radio communication terminal itself.

Figure 3:
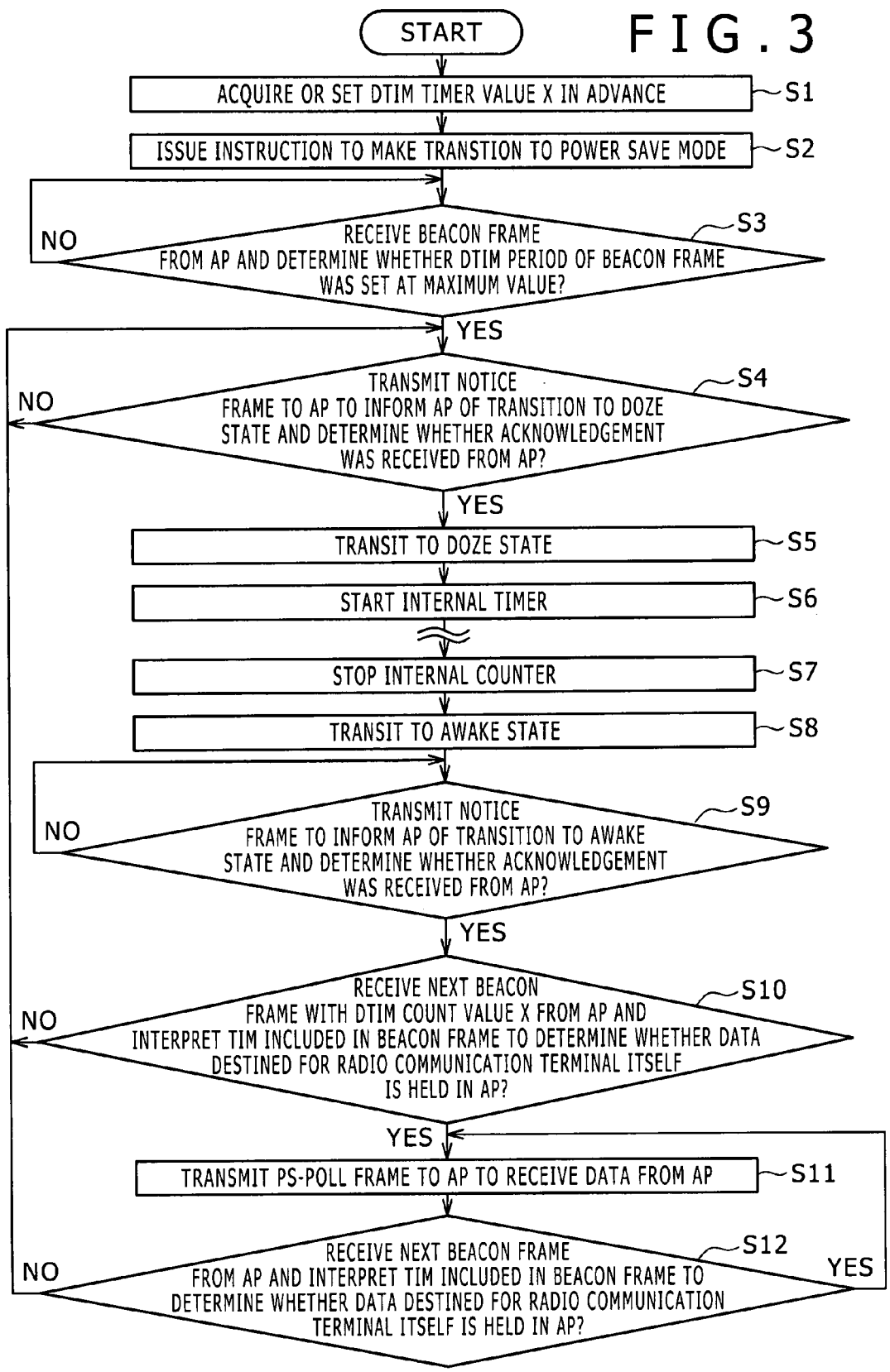
FIG. 3 shows a flowchart of a processing procedure carried out by a radio communication terminal to repeat doze and awake states alternately after the radio communication terminal enters a power save mode.

FIG. 3 shows a flowchart of a processing procedure carried out by a radio communication terminal to repeatedly make transitions from the doze state to the awake state alternately and vice versa after the radio communication terminal enters the power save mode. The processing carried out by the radio communication terminal in accordance with the processing procedure can actually be performed by the MAC layer processing unit 14.

The flowchart shown in the figure starts with a step S1 at which the radio communication terminal acquires or sets the DTIM timer value X in advance. As conceivable typical methods to determine the DTIM timer value X, for example, the user directly selects a value to be used as the DTIM timer value X. As an alternative, the user makes use of the DTIM count value verified as the DTIM count value of a beacon frame received right before a transition from the active mode to the power save mode. As another alternative, the user determines the DTIM timer value X uniquely on the basis of information such as the DTIM period included in the beacon frame or a saved MAC address.

Then, at the next step S2, an instruction to make a transition from the active mode to the power save mode is issued to the MAC layer processing unit 14. Subsequently, at the next step S3, a beacon frame is received from the radio communication base station (AP) and examined to produce a result of determination as to whether or not the value of the DTIM period included in the beacon frame as shown in FIG. 2 has been set in the DTIM count of the same beacon frame as an initial value of the DTIM count. If the result of the determination indicates that the value of the DTIM period included in the beacon frame has not been has been set at in the DTIM count of the same beacon frame as an initial value of the DTIM count, the flow of the processing procedure goes back to the step S3 to repeat the process of the step S3. As a matter of fact, the process of the step S3 is carried out repeatedly till the result of the determination indicates that the value of the DTIM period included in the beacon frame has been set in the DTIM count of the same beacon frame as an initial value of the DTIM count. As the result of the determination indicates that the value of the DTIM period included in the beacon frame has been set in the DTIM count of the same beacon frame as an initial value of the DTIM count, the flow of the processing procedure goes on to the step S4 to transmit a notice frame to the radio communication base station to inform the radio communication base station that the radio communication terminal is going to make a transition to the doze state of the power save mode and produce a result of determination as to whether or not an acknowledgement of the notice frame indicating the impending transition to the doze state has been received from the radio communication base station. Initially, the transition to the doze state of the power save mode is a transition right after the departure from the active mode. If the result of the determination indicates that an acknowledgement of the notice frame indicating the impending transition to the doze state has not been received from the radio communication base station, the flow of the processing procedure goes back to the step S4 to repeat the process of the step S4. As a matter of fact, the process of the step S4 is carried out repeatedly till the result of the determination indicates that an acknowledgement of the notice frame indicating the impending transition to the doze state has been received from the radio communication base station. As the result of the determination indicates that an acknowledgement of the notice frame indicating the impending transition to the doze state has been received from the radio communication base station, the flow of the processing goes on to the step S5 at which the radio communication terminal actually makes a transition to the doze state of the power save mode.

Then, at the next step S6 following the transition to the doze state of the power save mode, the MAC layer processing unit 14 activates an internal timer and counts down the contents of the timer in a state of waiting for an expected timing to receive a next beacon frame with the DTIM count value X from the radio communication base station.

Then, at the next step S7, the MAC layer processing unit 14 stops the operation of the internal timer. Subsequently, at the next step S8, a transition from the doze state to the awake state is made with a timing adjusted to the expected timing to receive the next beacon frame with the DTIM count value X from the radio communication base station. Then, the processing procedure goes on to a step S9 to transmit a notice frame to the radio communication base station to inform the radio communication base station that the radio communication terminal has made a transition from the doze state to the awake state of the power save mode and produce a result of determination as to whether or not an acknowledgement of the notice frame has been received from the radio communication base station. If the result of the determination indicates that an acknowledgement of the notice frame indicating the transition from the doze state to the awake state has not been received from the radio communication base station, the flow of the processing procedure goes back to the step S9 to repeat the process of the step S9. As a matter of fact, the process of the step S9 is carried out repeatedly till the result of the determination indicates that an acknowledgement of the notice frame indicating the transition from the doze state to the awake state has been received from the radio communication base station.

As the result of the determination indicates that an acknowledgement of the notice frame indicating the transition from the doze state to the awake state has been received from the radio communication base station, the flow of the processing goes on to the step S10 to indeed receive the next beacon frame with the DTIM count value X from the radio communication base station and interpret the TIM included in the beacon frame in order to produce a result of determination as to whether or not a data frame destined for the radio communication terminal itself is held in a buffer employed in the radio communication base station.

If the determination result produced at the step S10 is a NO indicating that a data frame destined for the radio communication terminal itself is not held in the buffer employed in the radio communication base station, the flow of the processing procedure goes back to the step S4, the transition to the doze state of the power save mode will be made from the awake state of the same power save mode.

If the determination result produced at the step S10 (yes) indicates that a data frame destined for the radio communication terminal itself is held in the buffer employed in the radio communication base station, on the other hand, the flow of the processing procedure goes on to a step S11 at which a PS-Poll frame is transmitted to the radio communication base station in order to receive the data frame stored in the buffer from the radio communication base station.

Then, the flow of the processing procedure goes on to a step S12 to receive a next beacon frame from the radio communication base station and interpret the TIM included in the beacon frame in order to produce a result of determination as to whether or not a data frame destined for the radio communication terminal itself is held in the buffer employed in the radio communication base station. If the result of the determination indicates that a data frame destined for the radio communication terminal itself is held in the buffer employed in the radio communication base station, the processing procedure goes back to the step S11 at which a PS-Poll frame is transmitted to the radio communication base station in order to receive the data frame stored in the buffer from the radio communication base station. If the result of the determination indicates that a data frame destined for the radio communication terminal itself is not held in the buffer of the radio communication base station, on the other hand, the flow of the processing procedure goes back to the step S4 to transmit a notice frame to the radio communication base station to inform the radio communication base station that the radio communication terminal is going to make a transition to the doze state of the power save mode and produce a result of determination as to whether or not an acknowledgement of the notice frame indicating the impending transition to the doze state has been received from the radio communication base station.

As described above, as long as the radio communication terminal is operating in the power save mode, the radio communication terminal makes a transition from the doze state to the awake state and vice versa repeatedly. In addition, in the course of the processing carried out by the radio communication terminal, instead of producing a result of determination as to whether or not the received beacon frame is a beacon frame including a DTIM, the radio communication terminal produces a result of determination as to whether or not the received beacon frame is a beacon frame having the DTIM count value X in the process carried out at the step S10. The rest of the processing procedure is basically the same as the processing procedure in the past.

Figure 4:
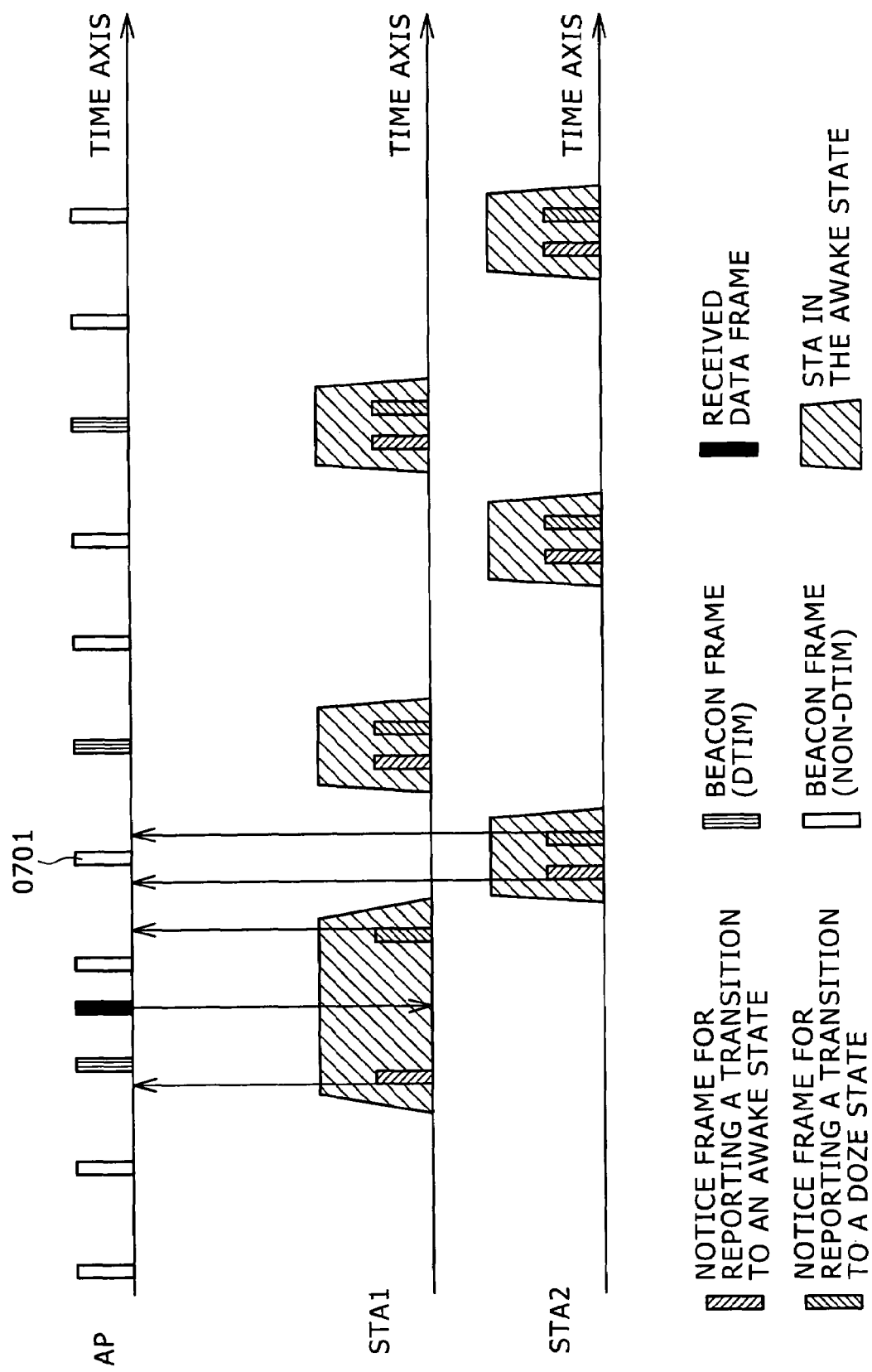
FIG. 4 is a diagram showing a typical procedure of an operation carried out by a radio communication terminal in the power save mode to receive data from a radio communication base station in a radio communication system employing the radio communication base station connected to a plurality of radio communication terminals each implementing the processing procedure represented by the flowchart shown in FIG. 3.

FIG. 4 is a diagram showing a typical procedure of an operation carried out by a radio communication terminal in the power save mode to receive data from the radio communication base station in a radio communication system employing the radio communication base station connected to a plurality of radio communication terminals each implementing the processing procedure represented by the flowchart shown in FIG. 3. In the typical procedure shown in FIG. 4, the radio communication system employs the radio communication base station AP and 2 radio communication terminals STA1 and STA2, which are each connected to the radio communication base station AP. FIG. 4 shows an assumed stage at which one of the radio communication terminals receives data from the other radio communication terminal through the radio communication base station AP.

The radio communication base station AP broadcasts beacon frames 0201 to the radio communication terminals STA1 and STA2 periodically. The broadcasted beacon frames 0201 include a DTIM beacon frame 0202 containing a DTIM, which is a TIM having a timer value equal to 0.

The radio communication terminal STA1 operates with the DTIM period used as the beacon acquisition period having a DTIM count value of 0 as the starting point in the same way as the radio communication system in the past. That is to say, the radio communication terminal STA 1 makes a transition from the doze state to the awake state with a timing adjusted to the arrival of a beacon frame 0202 including a DTIM. After the transition from the doze state to the awake state, the radio communication terminal STA1 transmits a null frame serving as a notice frame indicating the transition from the doze state to the awake state to the radio communication base station AP, receiving the expected DTIM beacon frame 0202 from the radio communication base station AP. If the DTIM beacon frame 0202 includes a TIM indicating that a data frame destined for the radio communication terminal STA1 is held in the buffer employed in the radio communication base station AP, the radio communication terminal STA1 transmits a PS-Poll frame to the radio communication base station AP in order to request the radio communication base station AP to deliver the data frame to the radio communication terminal STA1. Then, the radio communication terminal STA1 receives the data frame from the radio communication base station AP.

In place of a beacon frame 0202 including a DTIM, the radio communication terminal STA2 uses a beacon frame including a DTIM count value of 1. That is to say, the radio communication terminal STA2 operates with the beacon acquisition period having a DTIM count value of 1 as the starting point. The radio communication terminal STA2 makes a transition from the doze state to the awake state with a timing adjusted to the arrival of a beacon frame including a DTIM count value of 1. After the transition from the doze state to the awake state, the radio communication terminal STA1 transmits a null frame serving as a notice frame indicating the transition from the doze state to the awake state to the radio communication base station AP, receiving the expected beacon frame including a DTIM count value of 1 from the radio communication base station AP.

In this way, the DTIM count value serving as the starting point of the beacon-frame acquisition period for a radio communication terminal is made different from the DTIM count value serving as the starting point of the beacon-frame acquisition period for another radio communication terminal so that the number of collisions of notice frames transmitted by the radio communication terminals STA1 and STA2 to the radio communication base station as notice frames contending with each other for the radio communication medium can be reduced as shown in FIG. 4. In the figure, the notice frames are each a frame used for notifying the radio communication base station AP of a transition from the doze state to the awake state or an impending transition from the awake state back to the doze state in the radio communication terminal STA1 or STA2.

Thus, every individual one of the radio communication terminals is capable of smoothly receiving a data frame destined for the individual radio communication terminal from the radio communication base station if a beacon frame received by the individual radio communication terminal from the radio communication base station after a transition from the doze state to the awake state indicates the existence of such a data frame in the radio communication base station and capable of quickly making a transition from the awake state back to the doze state. As a result, it is possible to prevent the power saving effect from deteriorating. In addition, since the timings with which the radio communication terminals transmit notice frames to the radio communication base station are distributed throughout a predetermined period of time in which beacon frames are broadcasted by the radio communication base station at beacon intervals, the performance of the radio communication system as a whole can be improved and the number of radio communication terminals that can be connected to the same radio communication base station can be increased.

A typical preferred embodiment of the present invention has been explained above by referring to diagrams. It is obvious, however, that a person skilled in the art is capable of changing the embodiment and providing a substitute for the embodiment as long as the changes and/or the substitute are within the range not deviating from essentials of the present invention.

In addition, it should be understood by those skilled in the art that a variety of modifications, combinations, sub-combinations and alterations may occur in dependence on design requirements and other factors insofar as they are within the scope of the appended claims or the equivalents thereof.

The description given in this specification is focused on an embodiment applied to a radio communication system operating in the infrastructure BSS mode conforming to the IEEE802.11 standards. However, essentials of the embodiment are by no means limited to the embodiment. That is to say, the present invention can be applied to any other radio communication system as long as, in the system, a radio communication base station broadcasts beacon frames periodically to radio communication terminals connected to the radio communication base station and each of the radio communication terminals carries out an operation to receive the broadcasted beacon frames at a rate determined in advance.

In addition, the present invention can also be applied to radio communication systems of a variety of types. For example, the present invention can also be applied to a radio communication system in which a transmitting radio communication terminal transmits data to a receiving radio communication terminal non-periodically and a radio communication system in which a transmitting radio communication terminal broadcasts pieces of information periodically to receiving radio communication terminals whereas each of the receiving radio communication terminals receives the pieces of information at a rate determined in advance. In this case, the information broadcasted by the transmitting radio communication terminal is not limited to a beacon. On top of that, the communication media is not limited to wire or radio communication media.

In a word, the present invention has been exemplified by describing an embodiment as an example. However, the contents of the specification should not be interpreted as limitations imposed on the present invention. In order to determine essentials of the present invention, the reader is suggested to refer to claims appended to the specification.

What is claimed is:

1. A communication system wherein:
   non-periodical data communications are carried out between an information transmitting terminal and one or more information receiving terminals;
   said information transmitting terminal periodically broadcasts network control information to said information receiving terminals;
   each of said information receiving terminals receives said network control information from said information transmitting terminal at a rate determined in advance;
   each of said information receiving terminals receives said network control information from said information transmitting terminal in an information acquisition period; and
   specific ones of said information receiving terminals each arbitrarily shift the starting point of said information acquisition period of said specific information receiving terminal; and
   wherein:
   each individual one of said information receiving terminals has a power save mode for reducing the power consumption of said individual information receiving terminal by carrying out an intermittent operation to make a transition from a doze state in which operations of at least some circuit modules of said individual information receiving terminal are stopped to an awake state in which said individual information receiving terminal is functioning fully and vice versa; and
   in said power save mode, said individual information receiving terminal makes a transition from said doze state to said awake state with a timing adjusted to said information acquisition period of said individual information receiving terminal to receive said network control information from said information transmitting terminal.

2. The communication system according to claim 1 wherein each of said specific information receiving terminals arbitrarily determines the starting point of said information acquisition period of said specific information receiving terminal on the basis of information output by said information transmitting terminal.

3. The communication system according to claim 1 wherein each of said specific information receiving terminals arbitrarily determines the starting point of said information acquisition period of said specific information receiving terminal on the basis of information held by said specific information receiving terminal itself.

4. The communication system according to claim 1 wherein said individual information receiving terminal operating in said power save mode transmits a notice frame to said information transmitting terminal to notify said information transmitting terminal that said individual information receiving terminal has made a transition from said doze state to said awake state.

5. The communication system according to claim 4 wherein:
   said individual information receiving terminal notifies said information transmitting terminal that said individual information receiving terminal is operating in said power save mode;
   said information transmitting terminal provides said network control information with a TIM (Traffic Indication Map) for indicating that data destined for said individual information receiving terminal is held in a buffer employed by said information transmitting terminal and transmits said network control information including said TIM to said individual information receiving terminal; and
   said individual information receiving terminal operating in said power save mode receives said network control information including said TIM from said information transmitting terminal after making a transition from said doze state to said awake state and then transmits a notice frame to said information transmitting terminal in order to request said information transmitting terminal to transmit said data destined for said individual information receiving terminal to said individual information receiving terminal.

6. The communication system according to claim 4 wherein said individual information receiving terminal operating in said power save mode adopts a random back-off algorithm to transmit said notice frame to said information transmitting terminal and make a trial to retransmit said notice frame to said information transmitting terminal in case said notice frame collides with another signal in a communication medium.

7. The communication system according to claim 5 wherein:
   said information transmitting terminal provides said TIM with timer information decremented from an initial value toward zero each time said information transmitting terminal broadcasts said network control information to said information receiving terminals and reset back at said initial value when said timer information becomes equal to zero; and
   at least some particular ones of said information receiving terminals operating in said power save mode each set the starting point of said information acquisition period of said particular information receiving terminal to receive said network control information from said information transmitting terminal at a point of time the value of said timer information becomes equal to a value determined arbitrarily by said particular information receiving terminal itself.

8. The communication system according to claim 7 wherein each of said particular information receiving terminals operating in said power save mode arbitrarily determines said value of said timer information to be used as the starting point of said information acquisition period of said particular information receiving terminal to receive network control information from said information transmitting terminal on the basis of information output by said information transmitting terminal.

9. The communication system according to claim 7 wherein each of said particular information receiving terminals operating in said power save mode arbitrarily determines said value of said timer information to be used as the starting point of said information acquisition period of said particular information receiving terminal to receive network control information from said information transmitting terminal on the basis of information held by said particular information receiving terminal itself.

10. A communication apparatus for carrying out non-periodical data communications with another terminal, said communication apparatus comprising:
   a reception-processing unit for processing a signal received from said other terminal;
   a transmission-processing unit for processing a signal to be transmitted to said other terminal;
   a data processing unit for processing data to be transmitted to said other terminal as data to be subjected to reception processing in said other terminal; and
   a control unit for controlling operations carried out by said reception-processing unit, said transmission-processing unit and said data processing unit,
wherein said control unit controls processing to receive network control information broadcasted periodically by said other terminal during an information acquisition period having the starting point thereof arbitrarily movable; and
wherein:
   said control unit has a power save mode for reducing the power consumption of said communication apparatus by carrying out an intermittent operation to repeatedly make a transition from a doze state in which operations of at least some circuit modules of said communication apparatus are stopped to an awake state in which said communication apparatus is functioning fully and vice versa; and
   in said power save mode, said control unit drives said communication apparatus to make a transition from said doze state to said awake state with a timing adjusted to said information acquisition period of said communication apparatus to receive said network control information from said other terminal.

11. The communication apparatus according to claim 10 wherein said control unit determines the starting point of said information acquisition period of said communication apparatus on the basis of information output by said other communication terminal.

12. The communication apparatus according to claim 10 wherein said control unit determines the starting point of said information acquisition period of said communication apparatus on the basis of information held by said communication apparatus itself.

13. The communication apparatus according to claim 10 wherein said control unit operating in said power save mode transmits a notice frame to said other terminal to notify said other terminal that said communication apparatus has made a transition from said doze state to said awake state.

14. The communication apparatus according to claim 13, said communication apparatus having the following functions to be executed in said power save mode:
   a function to notify said other terminal that said communication apparatus is operating in said power save mode;
   a function to receive said network control information broadcasted by said other terminal receiving said notice frame indicating a transition from said doze state to said awake state from said communication apparatus operating in said power save mode as network control information including a TIM (Traffic Indication Map) for indicating that data destined for said communication apparatus is held in a buffer employed by said other terminal;
   a function to interpret said TIM included in said network control information received from said other terminal in order to produce a result of determination as to whether or not data destined for said communication apparatus is held in said buffer; and
   a function to transmit a notice frame to said other terminal in order to request said other terminal to transmit said data destined for said communication apparatus to said communication apparatus if said result of said determination indicates that said data destined for said communication apparatus is held in said buffer.

15. The communication apparatus according to claim 13 wherein said control unit operating in said power save mode adopts a random back-off algorithm to transmit said notice frame to said other terminal and make a trial to retransmit said notice frame to said other terminal in case said notice frame collides with another signal in a communication medium.

16. The communication apparatus according to claim 14 wherein:
   said TIM of said network control information broadcasted by said other terminal includes timer information decremented from an initial value toward zero each time said other terminal broadcasts said network control information to said communication apparatus and reset back at said initial value when said timer information becomes equal to zero; and
   said control unit operating in said power save mode executes control to set the starting point of said information acquisition period of said communication apparatus to receive said network control information from said other terminal at a point of time the value of said timer information becomes equal to a value determined arbitrarily by said communication apparatus itself.

17. The communication apparatus according to claim 16 wherein said control unit operating in said power save mode arbitrarily determines said value of said tinier information to be used as the starting point of said information acquisition period of said communication apparatus to receive network control information from said other terminal on the basis of information output by said other terminal.

18. The communication apparatus according to claim 16 wherein said control unit operating in said power save mode arbitrarily determines said value of said timer information to be used as the starting point of said information acquisition period of said communication apparatus to receive network control information from said other terminal on the basis of information held by said communication apparatus itself.

19. A communication method adopted by a communication apparatus to carry out non-periodical data communications with another terminal periodically broadcasting network control information to said communication apparatus, said communication method comprising:
   arbitrarily determining a start point of an information acquisition period for said communication apparatus to receive network control information from said other terminal; and
   acquiring said network control information from said other terminal at the start point of each information acquisition period of said communication apparatus and further comprising a step of notifying said other terminal that said communication apparatus is operating in a power save mode for reducing the power consumption of said communication apparatus by carrying out an intermittent operation to repeatedly make a transition from a doze state in which operations of at least some circuit modules of said communication apparatus are stopped to an awake state in which said communication apparatus is functioning fully and vice versa and further comprising the steps of:

fetching a TIM (Traffic Indication Map), which is used for indicating that data destined for said communication apparatus is held in a buffer employed by said other terminal, from said network control information received from said other terminal by said communication apparatus at said step of network control information acquisition after transmitting said notice frame indicating a transition from said doze state to said awake state to said other terminal;

interpreting said TIM included in said network control information acquired at said step of acquiring network control information, and determining as to whether or not data destined for said communication apparatus is held in said buffer; and transmitting a notice frame to said other terminal in order to request said other terminal to transmit said data destined for said communication apparatus to said communication apparatus if said result of said determination indicates that said data destined for said communication apparatus is held in said buffer.

20. The communication method according to claim 19, further comprising the steps of:

initially setting said doze state;

making a transition from said doze state to said awake state with a timing adjusted to said information acquisition period of said communication apparatus to receive network control information from said other terminal;

transmitting a notice frame to said other terminal in order to notify said other terminal that said communication apparatus has made said transition from said doze state to said awake state; and making a transition to said doze state.

21. The communication method according to claim 20 wherein, at said step of state-transition, said communication apparatus adopts a random back-off algorithm to transmit said notice frame to said other terminal and make a trial to retransmit said notice frame to said other terminal in case said notice frame collides with another signal in a communication medium.

22. The communication method according to claim 21 wherein, at said step of data-transmission request, said communication apparatus adopts a random back-off algorithm to transmit said notice frame to said other terminal and make a trial to retransmit said notice frame to said other terminal in case said notice frame collides with another signal in a communication medium.

23. The communication method according to claim 21 wherein:

said TIM of said network control information broadcasted by said other terminal is provided with timer information to be decremented from an initial value toward zero each time said other terminal broadcasts said network control information to said communication apparatus and to be reset back at said initial value when said timer information becomes equal to zero; and at said step of determining starting point, the starting point of said information acquisition period of said communication apparatus to receive said network control information from said other terminal is set at a point of time the value of said timer information becomes equal to a value determined arbitrarily by said communication apparatus itself.

* * * * *